(12) United States Patent
Shribak

(10) Patent No.: US 7,233,434 B2
(45) Date of Patent: Jun. 19, 2007

(54) ORIENTATION INDEPENDENT DIFFERENTIAL INTERFERENCE CONTRAST MICROSCOPY TECHNIQUE AND DEVICE

(75) Inventor: Mykhailo Shribak, Woods Hole, MA (US)

(73) Assignee: Marine Biological Laboratory, Woods Hole, MA (US)

( * ) Notice: Subject to any disclaimer, the term of this patent is extended or adjusted under 35 U.S.C. 154(b) by 235 days.

(21) Appl. No.: 11/002,834

(22) Filed: Dec. 2, 2004

(65) Prior Publication Data

US 2005/0152030 A1 Jul. 14, 2005

Related U.S. Application Data

(60) Provisional application No. 60/530,496, filed on Dec. 17, 2003.

(51) Int. Cl.
G02B 21/00 (2006.01)

(52) U.S. Cl. ...................................................... 359/371

(58) Field of Classification Search ................ 359/368, 359/370, 371, 386
See application file for complete search history.

(56) References Cited

U.S. PATENT DOCUMENTS

| | | | |
|---|---|---|---|
| 2,601,175 A | 6/1952 | Smith | |
| 2,924,142 A | 2/1960 | Nomarski | |
| 4,795,246 A | 1/1989 | Lord | |
| 5,317,644 A * | 5/1994 | Kenyon et al. | ............. 382/133 |
| 6,128,127 A | 10/2000 | Kusaka | |
| 6,433,876 B1 | 8/2002 | Kuhn | |
| 2003/0161038 A1 | 8/2003 | Tobben et al. | |
| 2004/0017609 A1 | 1/2004 | Danz et al. | |

OTHER PUBLICATIONS http://microscope.fsu.edu/primer/techniques/dic/dicintro.html; Nov. 15, 2004 1-19.
Noguchi et al., "Measurement of 2-D Birefringence Distribution," SPIE vol. 1720 (1992) 367-378.
Holzwarth et al., "Improving DIC Microscopy with Polarization Modulation," Journal of Microscopy, vol. 188, pt. 3, Dec. 1997, pp. 249-254.
Holzwarth et al., "Differential Interference Contrast Microscopy Gets," Biophotonics International Jul./Aug. 2001, pp. 46-47.
Holzwarth et al., "Polarization-Modulated Differential-Interference Contrast Microscopy with a Variable Retarder," Applied Optics, vol. 39, No. 34, Dec. 1, 2000, pp. 6288-6294.

(Continued)

*Primary Examiner*—Alessandro Amari
(74) *Attorney, Agent, or Firm*—Wolf, Greenfield & Sacks, P.C.

(57) ABSTRACT

A method for performing differential interference contrast microscopy on a specimen includes collecting at least two images with illumination respectively having first and second beam-shear directions relative to a rotational orientation of the specimen, determining data associated with an intensity distribution of each of the collected images, and calculating values having a spatial distribution that is substantially independent of the rotational orientation of the specimen. A differential interference contrast microscope includes a beam-shearing assembly that includes a beam-shearing component. The beam-shearing assembly is configured to provide a variable shear vector without a movement of the beam-shearing component. A microscopy system can include the microscope and an imaging-control unit.

11 Claims, 10 Drawing Sheets

OTHER PUBLICATIONS

Preza et al., "Imaging Models for Three-Dimensional Transmitted-Light DIC Microscopy," Scientce & Technology, 1996, pp. 1-13.

Shribak et al., "Techniques for Fast and Sensitive Measurements of Two-Dimensional Birefringence Distributions," Applied Optics, vol. 42, No. 16, Jun. 1, 2003, pp. 3009-3017.

Amison et al., "Linear Phase Imaging Using Differential Interference Contrast Microscopy," Journal of Microscopy, vol. 214, Pt. 1, Apr. 2004, pp. 7-12.

Preza, "Rotational-Diversity Phase Estimation From Differential-Interference-Contrast Micrscopy Images," Journal of Optical Soc. Am. A. , vol. 17, No. 3, pp. 415-424.

Inque, Cell Division and the Mitotic Spindle, The Journal of Cell Biology, vol. 91, No. 3, Pt. 2, Dec. 1981, 131s-147s.

Bajor et al., "Automated Polarimeter-Macroscope for Optical Mapping of Birefringence, Azimuths, and Transmission in Large Area Wafers. Part II. Measurement Setup and Results," Rev. Sci. Instrum. 66 (4) Apr. 1995, pp. 2991-2995.

Inque, "Video Image Processing Greatly Enchances Contrast, Quality, and Speed in Polarization-Based Microscopy," The Journal of Cell Biology, vol. 89, May 1981, pp. 346-356.

Oldenbourg et al., "New Polarized Light Microscope with Precision Universal Compensator," Journal of Microscopy, vol. 180, Pt. 2, Nov. 1995, pp. 140-147.

Hogan, "Getting the Small Picture," Photonics Spectra, Apr. 2003, pp. 58-64.

Otani et al., "Two-Dimensional Birefringence Measurement Using the Phase Shifting Technique," SPIE vol. 1720 (1992), pp. 346-354.

Glazer et al., "An Automatic Optical Imaging System for Birefringent Media," Proc. R. Soc. Land A. (1996), pp. 2751-2765.

Allen et al., "Video-Enhanced Contrast Polarization (AVEC-POL) Microscopy: A New Method Applied to the Detection of Birefringence in the Motile Reticulopodial Network of Allogromia Laticollaris," Cell Motility, (1981) 1:275-289.

Noguchi et al., "Measurement of 2-3 Birefringence Distribution," SPIE vol. 1720 (1992) 367-378.

Mei et al., "Fast Imaging Polarimetry with Precision Universal Compensator," SPIE vol. 2265, pp. 29-39.

Inque, "Cell Division and the Mitotic Spindle," The Journal of Cell Biology, vol. 91, No. 3, Pr. 2, Dec. 1981, pp. 131s-147s.

Bajor et al., "Automated Polarimeter-Macroscope for Optical Mapping of Birefringence, Azimuths, and Transmission in Large Area Wafers.," Rev. Sci. Instrum. 66 (4), Apr. 1995, pp. 2991-2995.

Holzwarth et al, "Polarization-Modulated Differential-Interference Contrast Microscopy with a Variable Retarder," Applied Optics, vol. 39, No. 34, Dec. 1, 2000, pp. 6288-6294.

Holzwarth et al., "Improving DIC Microscopy with Polarization Modulation," Journal of Microscopy, vol. 188, Pt., 3, Dec. 1997, pp. 249-254.

Allen et al., "The Zeiss-Nomarski Differential Interference Equipment for Transmitted-Light Microscopy," 69, (4), pp. 193-221.

Holzwarth et al., "Differential Interference Contrast Microscopy Gets Supercharged," Biophotonics International, 8 (6), pp. 46-47.

* cited by examiner

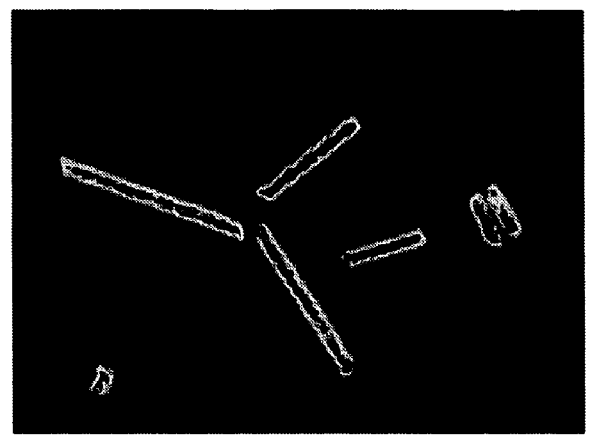
FIG. 7C Φ(x,y) Phase
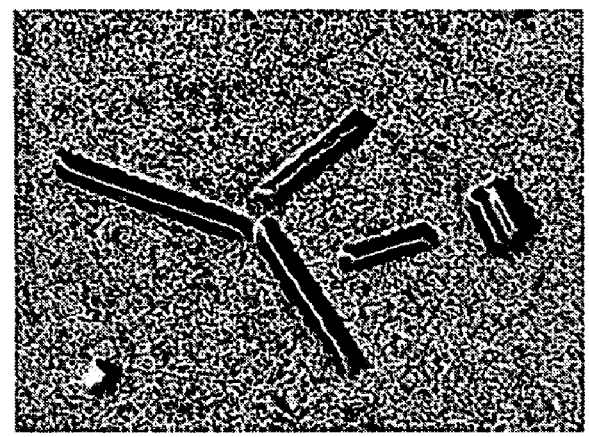
FIG. 7B θ(x,y) Gradient azimuth
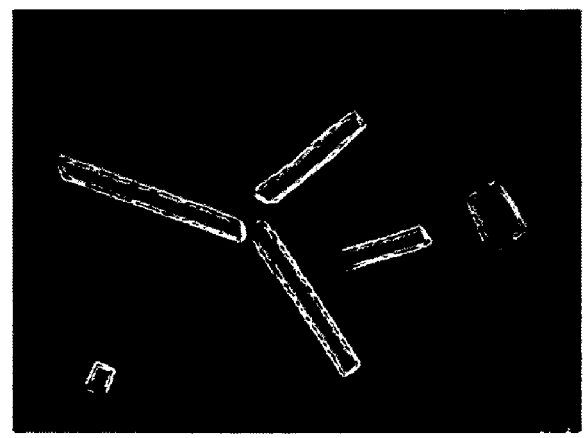
FIG. 7A γ(x,y) Gradient magnitude

ORIENTATION INDEPENDENT DIFFERENTIAL INTERFERENCE CONTRAST MICROSCOPY TECHNIQUE AND DEVICE

RELATED APPLICATIONS

This application claims priority under 35 U.S.C. § 119(e) to U.S. Provisional Application Ser. No. 60/530,496, entitled "Orientation Independent Differential Interference Contrast Microscopy Technique And Device," filed on Dec. 17, 2003, which is herein incorporated by reference in its entirety.

FEDERALLY SPONSORED RESEARCH

This invention was made with Government support under NIH grant R01-GM49210. The Government may have certain rights to this invention.

BACKGROUND OF INVENTION

1. Field of Invention

The invention relates to light microscopy, and, more particularly, to differential interference contrast microscopy.

2. Discussion of Related Art

Differential interference contrast (DIC) light microscopy is commonly employed to observe structure and motion in unstained living cells and isolated organelles. DIC microscopy utilizes a beam-shearing interference system in which an illumination beam is sheared into two beams having a spatial separation typically less than the resolution of the microscope. The two beams are recombined after passing through a specimen to produce an interference image related to optical phase gradients of the specimen.

A DIC microscopy can produce a monochromatic shadow-cast image of a specimen that displays a lateral gradient of the optical path presented by the specimen, i.e., a lateral phase gradient associated with the specimen. Those regions of the specimen where the optical path increases along a reference direction can appear brighter, while regions where the path differences decrease appear in reverse contrast. As the gradient of the optical path grows steeper, image contrast is increased.

Images are typically dependent on beam-shear direction because specimen gradients in a direction perpendicular to a beam-shear direction generally do not contribute to image contrast. A type of reflection microscope, which includes two DIC microscopes operating at different wavelengths, but sharing a single objective through a beam splitter, can help to reveal more specimen detail.

Video-processing techniques can be utilized to enhance contrast and/or remove background signals (such as fixed image noise due to dust particles or other imperfections in the optical system) by subtraction of a reference image with no specimen.

SUMMARY OF INVENTION

In a first aspect, the invention features a method for performing differential interference contrast microscopy on a specimen. The method includes collecting at least one image with illumination having a first beam-shear direction relative to a rotational orientation of the specimen, collecting at least one image with illumination having a second beam-shear direction relative to the rotational orientation of the specimen, determining data associated with an intensity distribution of each of the collected images, and calculating, from the determined data, values having a spatial distribution that is substantially independent of the rotational orientation of the specimen. The values represent a spatial distribution of an optical phase characteristic of the specimen.

In a second aspect, the invention features a differential interference contrast microscope. The microscope includes a beam-shearing assembly that includes a beam-shearing component. The beam-shearing assembly is configured to provide a variable shear vector without a movement of the beam-shearing component.

In a third aspect, the invention features a system for performing differential interference contrast microscopy. The system includes a microscope and an imaging-control unit. The microscope includes a beam-shearing assembly configured to provide a variable shear vector, and the assembly includes a beam-shearing component, and a shear-direction control component. The imaging-control unit is in communication with the beam-shearing assembly to cause the shear-direction control component to vary the shear vector.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6b is a graph of the image intensity profile for section A–A' of FIG. 6a;

FIG. 6c is a graph of the image intensity profile for section B–B' for FIG. 6a;

FIG. 6d is a calculated orientation-independent gradient magnitude image, according to principles of the invention, associated with the collected image of FIG. 6a;

FIG. 7a is a calculated orientation-independent gradient magnitude image, corresponding to the image of FIG. 6d;

FIG. 7b is a calculated orientation-independent gradient direction image, according to principles of the invention, associated with the collected image of FIG. 6a; and FIG. 7c is a calculated orientation-independent specimen phase image, according to principles of the invention, associated with the collected image of FIG. 6a.

DETAILED DESCRIPTION

Figure 1A:
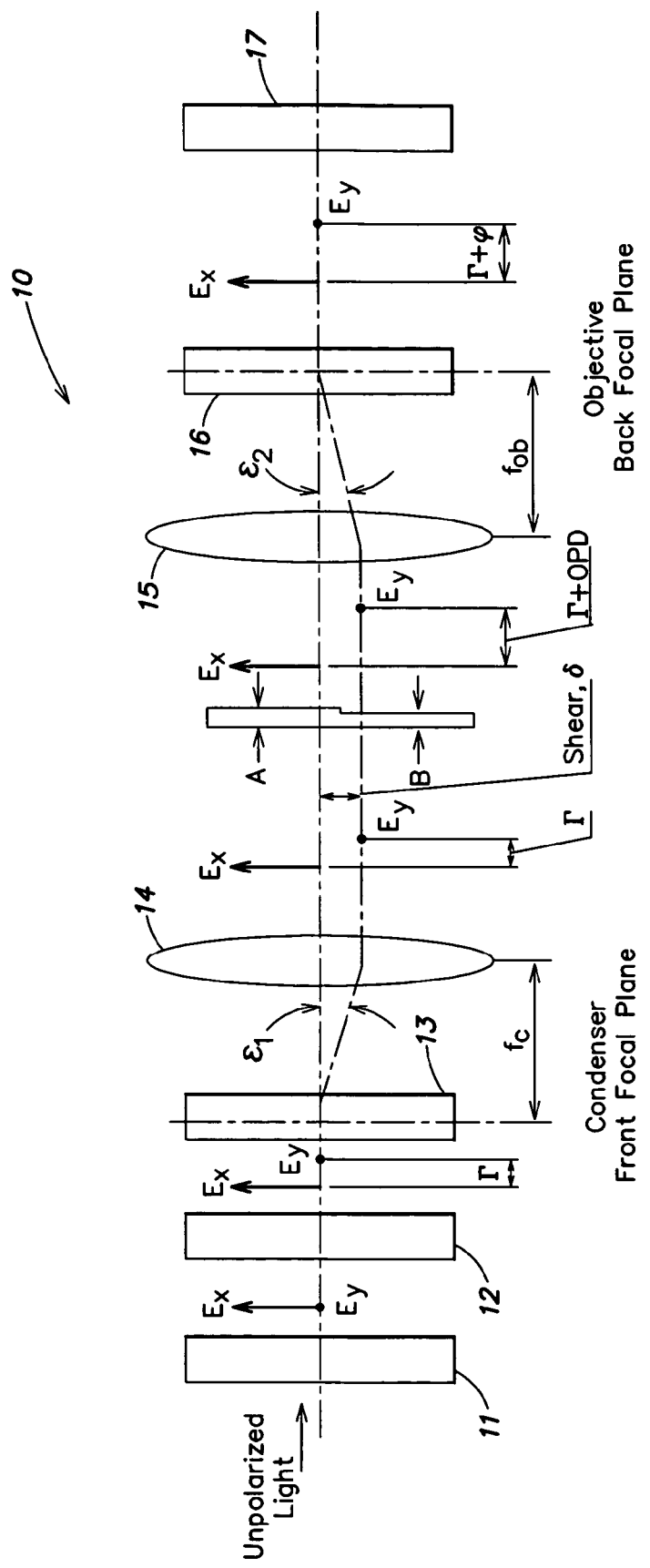
FIG. 1a is a block diagram of a conventional DIC microscope.

The invention arises, in part, from the realization that orientation-independent specimen images can be calculated from two or more images collected with different directions of beam-shear relative to the specimen. A relative beam-shear direction can be altered by, for example, rotating a specimen stage or a beam-shearing prism.

The invention also arises, in part, from the realization that a relative beam-shear direction can be altered without moving a specimen and without moving a beam-shearing prism. For example, a beam-shearing assembly can include two prisms and a third component that controls beam-shear direction.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1a illustrates a cross-sectional diagram of a prior art transmission DIC microscope 10. The microscope includes a polarizer 11, a phase retarder 12, a first Wollaston prism 13, a condenser lens 14, an objective lens 15, a second Wollaston prism 16, and an analyzer 17. The diagram also illustrates light-ray paths through the microscope 10.

The polarizer 11 polarizes light received from a non-polarized light source, creating a linearly polarized beam having two components $E_x$, $E_y$ with equal intensities. The phase retarder 12 introduces a variable phase shift $\Gamma$ between the two orthogonal components $E_x$, $E_y$ produced by the polarizer 11. This displacement can be varied to adjust the contrast of an image produced by the microscope 10.

The first prism 13 splits the the two polarization components $E_x$, $E_y$ by an angle $\epsilon_1$, and, in cooperation with the condenser lens 14 (at focal distance $f_c$,) laterally displaces the two polarization components $E_x$, $E_y$ at the phase object (specimen) plane by a shear vector having a shear direction and a shear magnitude $\delta$. The polarization direction of the polarizer 11 is oriented at 45° relative to the beam shear direction of the first prism 13.

After passing through the specimen, i.e., a phase object, the sheared beams $E_x$, $E_y$ have their relative phases shifted by an optical path difference (OPD) due to spatial variations in the phase object presented by the specimen. As illustrated in this example, the phase object varies due to a step thickness variation of the specimen, i.e., thickness A in one portion and thickness B in a second portion. Because the two beams $E_x$, $E_y$ are displaced laterally by a small distance, they experience different paths through the specimen.

After passing through the objective lens 15, the beams $E_x$, $E_y$ are split by an angle $\epsilon_2$ and are recombined by the second Wollaston prism 16 (at focal distance $f_{ob}$.) The recombined beam components are displaced, relative to each other, by $\Gamma+\phi$ due to the action of the retarder 12 and the specimen. The analyzer 17, a linear polarizer oriented at −45° relative to the beam shear direction, then selects portions of the recombined beam to contribute to an image. A typical image reveals gradients in the specimen's phase object that have a component parallel to the shear direction of the first prism 13.

Figure 1B:
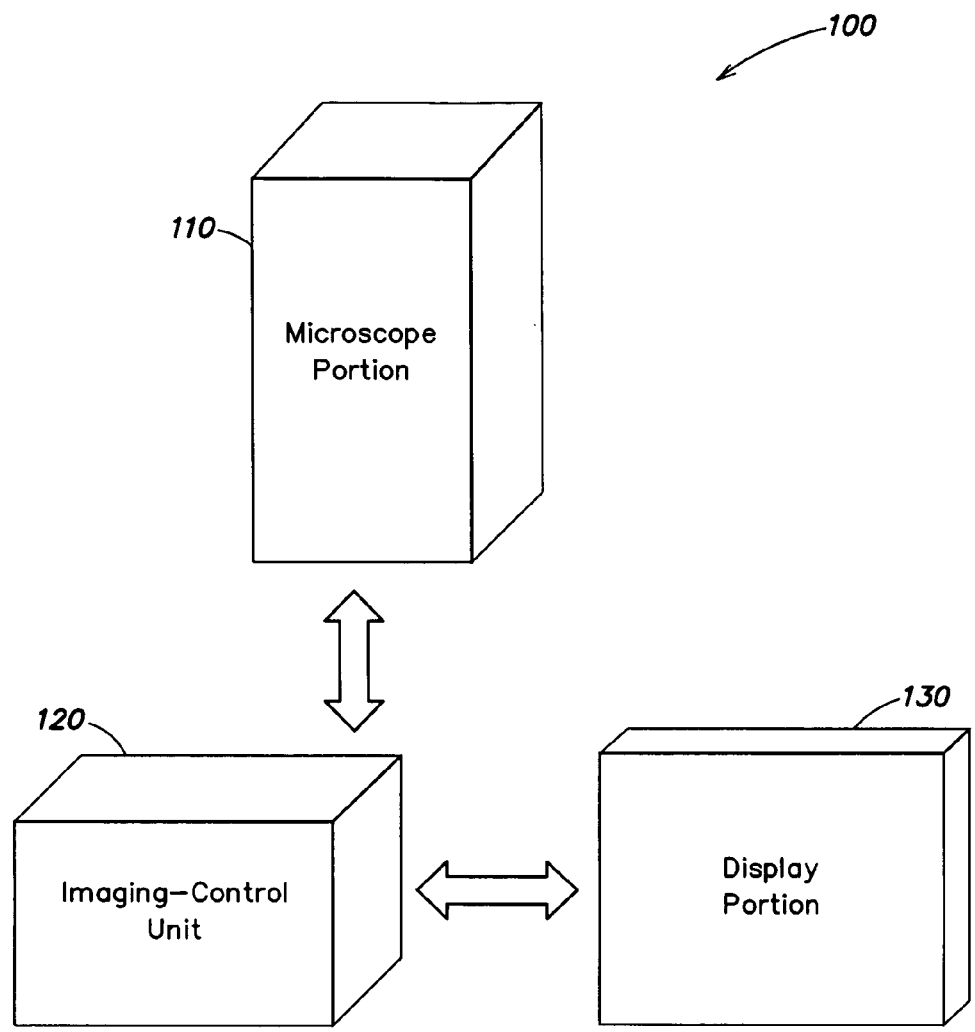
FIG. 1b is a block diagram of one embodiment of a system for performing DIC microscopy, according to principles of the invention.

FIG. 1b illustrates a block diagram of an embodiment of a microscopy system 100, according to one embodiment of the invention. The system 100 includes a microscope portion 110, an imaging-control unit 120, and a display portion 130. The imaging-control unit 120 communicates with the microscope portion 110 and the display unit 130 via any suitable means, such as wired, wireless, and/or optical connections.

The microscope portion 110 is configured to obtain DIC images from specimens, and has a variable beam shear direction. In the illustrated embodiment, the imaging-control unit 120 may generate control signals to provide automated control of the shear direction. In one embodiment, the microscope portion 110 is configured to provide a e beam shear direction that can be varied, relative to a specimen, without movement of the specimen and without movement of a beam splitting prism.

One embodiment of a microscope, according to the invention, that can be used as the microscope unit 120 is described in more detail below, with reference to FIG. 3. The system 100 can implement methods that entail automated collection of images at different shear directions.

The imaging-control unit 120 automates control of beam-shear, supports extraction of data from collected images, and supports calculation of values derived from the extracted data. The imaging-control unit 120 may also generate information for display 130. The display 130 may be any suitable device, such as a cathode-ray-tube display or a liquid-crystal display. According to one aspect of the invention, the imaging-control unit 120 supports automation of methods described with reference to FIG. 2.

The imaging-control unit 120 can be any suitable device capable of computation and control. For example, the imaging-control unit 120 can be any personal computer, for example, a PENTIUM processor-based computer, or other processor-based computer, utilizing, for example, the WINDOWS, UNIX, MACINTOSH, LINUX, or other operating system.

Moreover, any or all of the microscope unit 110, the control unit 120, and the display unit 130 can be included in a single component of the microscopy system 100.

Figure 2:
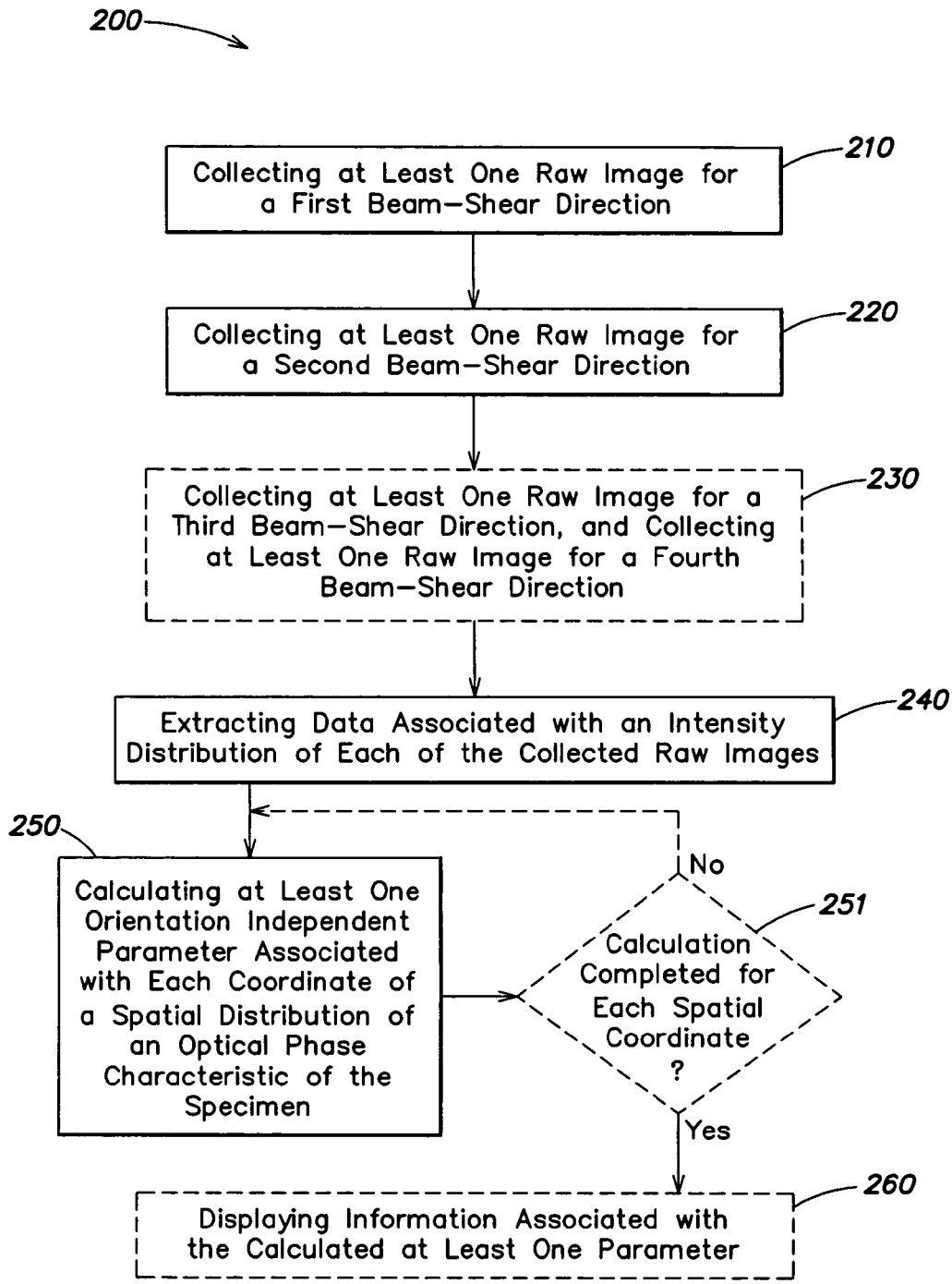
FIG. 2 is a flow diagram of one embodiment of a method for performing DIC microscopy, according to principles of the invention.

FIG. 2 illustrates a flow diagram of a method 200 for performing DIC microscopy, according to one embodiment of the invention. The method 200 includes an act 210 of collecting at least one image for a first beam-shear direction relative to a rotational orientation of the specimen, an act 220 of collecting at least one image for a second beam-shear direction relative to the rotational orientation of the specimen, an act 240 of extracting data associated with an intensity distribution of each of the collected images, and an act 250 of calculating, from the extracted data, values associated with a spatial distribution of an optical phase characteristic of the specimen.

The phrase "spatial distribution" is herein used to refer to any data that is a function of spatial position with at least two spatial dimensions. The data can be a continuous or discrete function of position. Data having a spatial distribution in two dimensions can be expressed, for example, as a function of x and y, or as a function of a column position and a row position of, for example, a pixel location in a spatial distribution of data. The act 250 of calculating can occur, for example, on a pixel-by-pixel basis, for example, sequentially or simultaneously technique. More generally, any suitable computational technique can be used for the act 250 of calculating.

The optical phase characteristic of a specimen is associated with the effect the specimen has on the phase of illumination passing through the specimen. The effect is a function of, for example, specimen thickness and/or refractive index.

The method 200 can also include an 230 act of collecting at least third and fourth additional images for additional beam-shear directions, and can include displaying 260 information associated with the calculated values.

In some embodiments, the method 200 is automated, for example, via use of the system 100 described above. For automation, the method 200 can be implemented, for example, in software, firmware or hardware (e.g. as an application-specific integrated circuit), which, for example, can be supported by and/or included in the imaging control unit 120. The software may be designed to run on general-purpose equipment or specialized processors dedicated to the functionality described herein. A hardware implementation can include, for example, one or more integrated circuits.

For example, the method 200 can be implemented as one or more computer programs. When executed, the one or more programs need not reside on a single computer or processor, but may be distributed in a modular fashion amongst a number of different computers or processors to implement various aspects of the present invention. The computers or processors can employ any one of a variety of operating systems or platforms. Additionally, such software may be written using any of a number of suitable programming languages and/or conventional programming or scripting tools, and also may be compiled as executable machine language code.

The data associated with the intensity distributions of the collected images can be, for example, the intensity magnitude distributions. The values can be a distribution of the phase gradient direction and/or magnitude associated with the optical phase characteristic of the specimen. As know to one having ordinary skill in DIC microscopy, the optical phase distribution of a specimen can vary to due, for example, thickness variations and/or refractive index variations of the specimen.

The calculated values have a spatial distribution that is independent of the rotational orientation of the specimen. That is, the same distribution of values, or substantially the same distribution of values, are calculated for any orientation of the beam-shear directions relative to the specimen. The first and second beam-shear directions need only be non-parallel to each other, for example, orthogonal.

For example, the calculated values can have a spatial distribution that is independent of the rotational orientation of the specimen relative to a microscope used to collect the images, and/or relative to the beam-shear directions used to collect the images.

The calculated values can be displayed as an image. For example, the image can present a calculated spatial distribution of values of the phase gradient direction or phase gradient magnitude. Alternatively, for example, the image can present a calculated spatial distribution of an optical phase characteristic, which corresponds to, for example, the thickness distribution of the specimen.

The distribution of values associated with a displayed image is independent of the rotational orientation of the specimen. For example, though the displayed image may be rotated from the viewpoint of a microscope user when a sample stage is rotated, the image does not vary relative to a coordinate system attached to the rotated image.

Because the calculated values have a spatial distribution of values that is independent of the rotational orientation of the specimen, the displayed calculated images of the specimen are also independent of the rotational orientation of the specimen. For example, though rotation of a specimen stage holding a specimen could cause a displayed calculated image to rotate, the spatial distribution of intensity values of images, calculated according to principles of the invention, are unchanged, i.e., are unaffected by a changed rotational orientation of the specimen stage relative to other components of a microscope.

Some examples of calculational techniques that can be used for calculating 250 in the method 200 are described next. These examples are intended to be illustrative of principles of the invention, but should be understood to be non-limiting; other embodiments of the invention can be implemented with other calculational techniques.

First, an intensity distribution I(x,y) of a DIC image of a specimen can be expressed with the following equation:

$$I(x, y) = \frac{1}{2}\tilde{I}\left(1 - \cos\left(\frac{2\pi}{\lambda}(\Gamma + \delta \cdot \gamma(x, y) \cdot \cos(\theta(x, y) - \sigma))\right)\right) + I_{min},$$

where x and y are the specimen spatial coordinates in a plane perpendicular to the optical axis of a microscope, $\tilde{I}$ is a light source intensity prior to shearing of an source beam into two beams, $\lambda$ is the light wavelength, $\Gamma$ is the relative optical path difference between the split light beams (referred to as "bias", and typically selected to be in a range of about $0.03\lambda$ to $0.12\lambda$ for good contrast,) $\delta$ is the shear distance between the split beams (i.e., the spatial separation of the beams at the specimen plane,) $\sigma$ is the shear azimuth (i.e., the angular direction of beam splitting,) $\gamma(x,y)$ is the spatial distribution of the magnitude of the specimen's phase gradient, $\theta(x,y)$ is the spatial distribution of the azimuth (i.e., direction) of the specimen's phase gradient, and $I_{min}$ is a background intensity corresponding to an image taken without a specimen. In a collected image, no contrast is expected for specimen phase gradient components having a direction perpendicular to the shear direction.

The expression for I(x,y) can be used, for example, to predict the image that a known or hypothetical specimen would produce for particular values of $\delta$, $\lambda$, $\sigma$, $\Gamma$, and $\tilde{I}$. According to principles of the invention, as illustrated in the following examples, calculational techniques derived from the above expression, or other suitable expressions, can be applied to data extracted from two or more collected images to calculate and display orientation independent specimen images.

As a first example, six images can be collected to give an exact solution for an orientation independent calculated image. In this example, four images are collected with a 90° of rotation of the shear direction $\sigma$ after each image, and the same non-zero bias value $\Gamma$ for each collected image. The image intensity distributions $I_1(x,y)$, $I_2(x,y)$, $I_3(x,y)$, $I_4(x,y)$ of the four images can be equated to the above-described expression (to simplify some expressions shown below, reference to (x,y) is implied for some variables having a spatial distribution):

$$\sigma = 0°: \quad I_1 = \frac{1}{2}\tilde{I}\left(1 - \cos\left(\frac{2\pi}{\lambda}(\Gamma + \delta \cdot \gamma \cdot \cos\theta)\right)\right) + I_{min},$$

$$\sigma = 90°: \quad I_2 = \frac{1}{2}\tilde{I}\left(1 - \cos\left(\frac{2\pi}{\lambda}(\Gamma + \delta \cdot \gamma \cdot \sin\theta)\right)\right) + I_{min},$$

$$\sigma = 180°: \quad I_3 = \frac{1}{2}\tilde{I}\left(1 - \cos\left(\frac{2\pi}{\lambda}(\Gamma - \delta \cdot \gamma \cdot \cos\theta)\right)\right) + I_{min},$$

$$\sigma = 270°: \quad I_4 = \frac{1}{2}\tilde{I}\left(1 - \cos\left(\frac{2\pi}{\lambda}(\Gamma - \delta \cdot \gamma \cdot \sin\theta)\right)\right) + I_{min},$$

and two images are collected for two of the same shear directions σ though without any bias, i.e., with Γ=0;

$$\sigma = 0° \text{ or } \sigma = 180°: \quad I'_0 = \frac{1}{2}\tilde{I}\left(1 - \cos\left(\frac{2\pi}{\lambda}\delta \cdot \gamma \cdot \cos\theta\right)\right) + I_{min},$$

$$\sigma = 90° \text{ or } \sigma = 270°: \quad I''_0 = \frac{1}{2}\tilde{I}\left(1 - \cos\left(\frac{2\pi}{\lambda}\delta \cdot \gamma \cdot \sin\theta\right)\right) + I_{min}.$$

The intensity distributions $I_1$, $I_2$, $I_3$, $I_4$, $I_0'$, $I_0''$ are determined at act 240 for the six collected images. The determined intensity information is then used to calculate specimen values at act 250. In this example, specimen values A and B are calculated as follows as follows:

$$A \equiv \frac{I_1 - I_3}{I_1 + I_3 - 2I'_0}\tan\left(\frac{\pi \cdot \Gamma}{\lambda}\right) = \tan\left(\frac{2\pi}{\lambda}\delta \cdot \gamma \cdot \cos\theta\right),$$

$$B \equiv \frac{I_2 - I_4}{I_2 + I_4 - 2I''_0}\tan\left(\frac{\pi \cdot \Gamma}{\lambda}\right) = \tan\left(\frac{2\pi}{\lambda}\delta \cdot \gamma \cdot \sin\theta\right).$$

These values can be used to calculate an orientation independent gradient magnitude distribution γ(x,y) and/or an orientation independent azimuth distribution θ(x,y) of optical paths for the specimen, as follows:

$$\gamma(x, y) = \frac{\lambda}{2\pi \cdot \delta}\sqrt{(\arctan A)^2 + (\arctan B)^2},$$

$$\theta(x, y) = \arctan\left(\frac{\arctan B}{\arctan A}\right).$$

It will be apparent, to one having ordinary skill in the light microscopy arts, that the above considerations can be exploited to extract a variety of information and/or generate a variety of images for a hypothetical or real specimen. For example, according to principles of the invention, once the magnitude and azimuth of the optical paths, γ(x,y) and θ(x,y), of a specimen have been determined, as described above, an "enhanced" DIC image, $I_{enh}$, of a specimen can be calculated for any selected shear direction, σ:

$$I_{enh}(x, y) = 1 - \cos\left(\frac{2\pi}{\lambda}(\Gamma + \delta \cdot \gamma(x, y) \cdot \cos(\theta(x, y) - \sigma))\right).$$

The enhanced image, $I_{enh}$, provides a calculated image for any desired shear direction σ without the requirement to directly collect an image for that shear direction σ.

Moreover, once the phase gradient direction and magnitude have been obtained, an optical phase distribution, Φ(x,y), for the specimen can be calculated, for example, via the following expression:

$$\Phi(x, y) = \frac{2\pi}{\lambda}\left(\int_0^x \gamma(x', 0) \cdot \cos\theta(x', 0) dx' + \int_0^y \gamma(x, y') \cdot \sin\theta(x, y') dy'\right).$$

Where calculations are performed in terms of pixels, this expression can have the following form:

$$\Phi_{mn} = \frac{2\pi}{\lambda}\left(\sum_{k=1}^{n}\gamma_{0k} \cdot \cos\theta_{0k} + \sum_{p=1}^{m}\gamma_{pn} \cdot \sin\theta_{pn}\right)$$

where m and n are the row and the column numbers of pixels, and $\Phi_{mn}$ is the value of the optical phase for the pixel m,n. More generally, any suitable method may be used for computations, such as iterative computations, and non-iterative Fourier phase integration, as will be understood both those having ordinary skill.

Moreover, background images can be taken, for example, without a specimen in a microscope, for example, to permit compensation of nonuniformity of the illumination source, if any exists. Nonuniform illumination can cause image artifacts when, for example, the specimen is rotated to change the rotational orientation of the shear direction σ relative to the specimen orientation. In one embodiment of the invention, the method 200 is implemented with a DIC microscope modified to permit quick automated control of beam-shear direction σ without rotation of the specimen. Such embodiments of the invention mitigate problems due to nonuniform illumination because multiple images can be collected without changing the rotational orientation of the specimen relative to the illumination. Some examples of modified DIC microscopes are describe below.

After completion of the above-described calculations, the calculated values can be presented as one or more calculated images. Such images can provide orientation independent calculated images, as described above.

In some embodiments, fewer than six images are collected to support calculation of orientation-independent values and images. Some approximations may be required to complete the calculations. For example, if the product of shear distance and gradient magnitude is small $$\left(\frac{2\pi}{\lambda}\delta\gamma \ll 1\right),$$

four images can be collected, and modeled as:

$$\text{for } \sigma = 0°, \quad I_1 = \frac{1}{2}\tilde{I}\left(1 - \cos\left(\frac{2\pi}{\lambda}\Gamma\right) + \frac{2\pi}{\lambda}\delta\gamma\sin\left(\frac{2\pi}{\lambda}\Gamma\right)\cos\theta\right) + I_{min};$$

$$\text{for } \sigma = 90°, \quad I_2 = \frac{1}{2}\tilde{I}\left(1 - \cos\left(\frac{2\pi}{\lambda}\Gamma\right) + \frac{2\pi}{\lambda}\delta\gamma\sin\left(\frac{2\pi}{\lambda}\Gamma\right)\sin\theta\right) + I_{min}$$

-continued for $\sigma = 180°$, $I_3 = \frac{1}{2}\tilde{I}\left(1 - \cos\left(\frac{2\pi}{\lambda}\Gamma\right) - \frac{2\pi}{\lambda}\delta\gamma\sin\left(\frac{2\pi}{\lambda}\Gamma\right)\cos\theta\right) + I_{\min}$; and for $\sigma = 270°$, $I_4 = \frac{1}{2}\tilde{I}\left(1 - \cos\left(\frac{2\pi}{\lambda}\Gamma\right) - \frac{2\pi}{\lambda}\delta\gamma\sin\left(\frac{2\pi}{\lambda}\Gamma\right)\sin\theta\right) + I_{\min}$.

Assuming that $I_{min}$ is small, the azimuth distribution $\theta(x,y)$ is:

$$\theta(x, y) = \arctan\left(\frac{I_2 - I_4}{I_1 - I_3}\right),$$

and the gradient magnitude $\gamma(x,y)$ is:

$$\gamma(x, y) = \frac{\lambda}{2\pi \cdot \delta}\tan\left(\frac{\pi \cdot \Gamma}{\lambda}\right)\sqrt{\left(\frac{I_1 - I_3}{I_1 + I_3}\right)^2 + \left(\frac{I_2 - I_4}{I_2 + I_3}\right)^2}.$$

As another example, two specimen images and three background images can be collected, and modeled as:

for $\sigma = 0°$, $I_1 = \tilde{I}\sin\left(\frac{\pi}{\lambda}\Gamma\right)\left(\sin\left(\frac{\pi}{\lambda}\Gamma\right) + \frac{2\pi}{\lambda}\delta\gamma\cos\left(\frac{\pi}{\lambda}\Gamma\right)\cos\theta\right) + I_{\min}$;

for $\sigma = 90°$, $I_2 = \tilde{I}\sin\left(\frac{\pi}{\lambda}\Gamma\right)\left(\sin\left(\frac{\pi}{\lambda}\Gamma\right) + \frac{2\pi}{\lambda}\delta\gamma\cos\left(\frac{\pi}{\lambda}\Gamma\right)\sin\theta\right) + I_{\min}$;

and background images without the specimen:

for $\sigma = 0°$, $I_{bg1} = \tilde{I}\sin^2\left(\frac{\pi}{\lambda}\Gamma\right) + I_{\min}$;

for $\sigma = 90°$ $I_{bg2} = \tilde{I}\sin^2\left(\frac{\pi}{\lambda}\Gamma\right) + I_{\min}$; and for $\Gamma=0$ and $\sigma$ is arbitrary, $I_0 = I_{min}$.

In this example, absorption is assumed to be negligible, and the gradient $\gamma$ is assumed to be small. Values A and B, in this example, are calculated as follows:

$$A \equiv \frac{I_1 - I_{bg1}}{I_{bg1} - I_{bg0}}\tan\left(\frac{\pi}{\lambda}\Gamma\right) = \frac{\tilde{I}\frac{2\pi}{\lambda}\delta\gamma\sin\left(\frac{\pi}{\lambda}\Gamma\right)\cos\left(\frac{\pi}{\lambda}\Gamma\right)\cos\theta}{\tilde{I}\sin^2\left(\frac{\pi}{\lambda}\Gamma\right)}\tan\left(\frac{\pi}{\lambda}\Gamma\right) = \frac{2\pi}{\lambda}\delta\gamma\cos\theta;$$

and $$B \equiv \frac{I_2 - I_{bg2}}{I_{bg2} - I_{bg0}}\tan\left(\frac{\pi}{\lambda}\Gamma\right) = \frac{\tilde{I}\frac{2\pi}{\lambda}\delta\gamma\sin\left(\frac{\pi}{\lambda}\Gamma\right)\cos\left(\frac{\pi}{\lambda}\Gamma\right)\sin\theta}{\tilde{I}\sin^2\left(\frac{\pi}{\lambda}\Gamma\right)}\tan\left(\frac{\pi}{\lambda}\Gamma\right) = \frac{2\pi}{\lambda}\delta\gamma\sin\theta.$$

The calculated values then provide $\gamma(x,y)$ and $\theta(x,y)$:

$$\gamma(x, y) = \frac{\lambda}{2\pi\delta}\sqrt{A^2 + B^2},$$

$$\theta(x, y) = \arctan\left(\frac{B}{A}\right).$$

Further approximations can be employed, for example, to simplify the calculations or to reduce the number of collected background images. For example, if $I_{bg0}$ is small it can be omitted in the above equations. Moreover, it will be apparent that the principles of the invention encompass collection of alternative numbers of images, for example, 3 or 5 or more than 6 images, and calculation, for example, of orientation independent images from the collected images.

The method 200 can be conveniently implemented, for example, by, in part, using a DIC microscope that has been modified to permit changing a beam shear direction without rotation of a specimen holder or movement of prism. Some examples of microscopes, according to principles or the invention, are described below with reference to FIGS. 3, 4, and 5.

Figure 3:
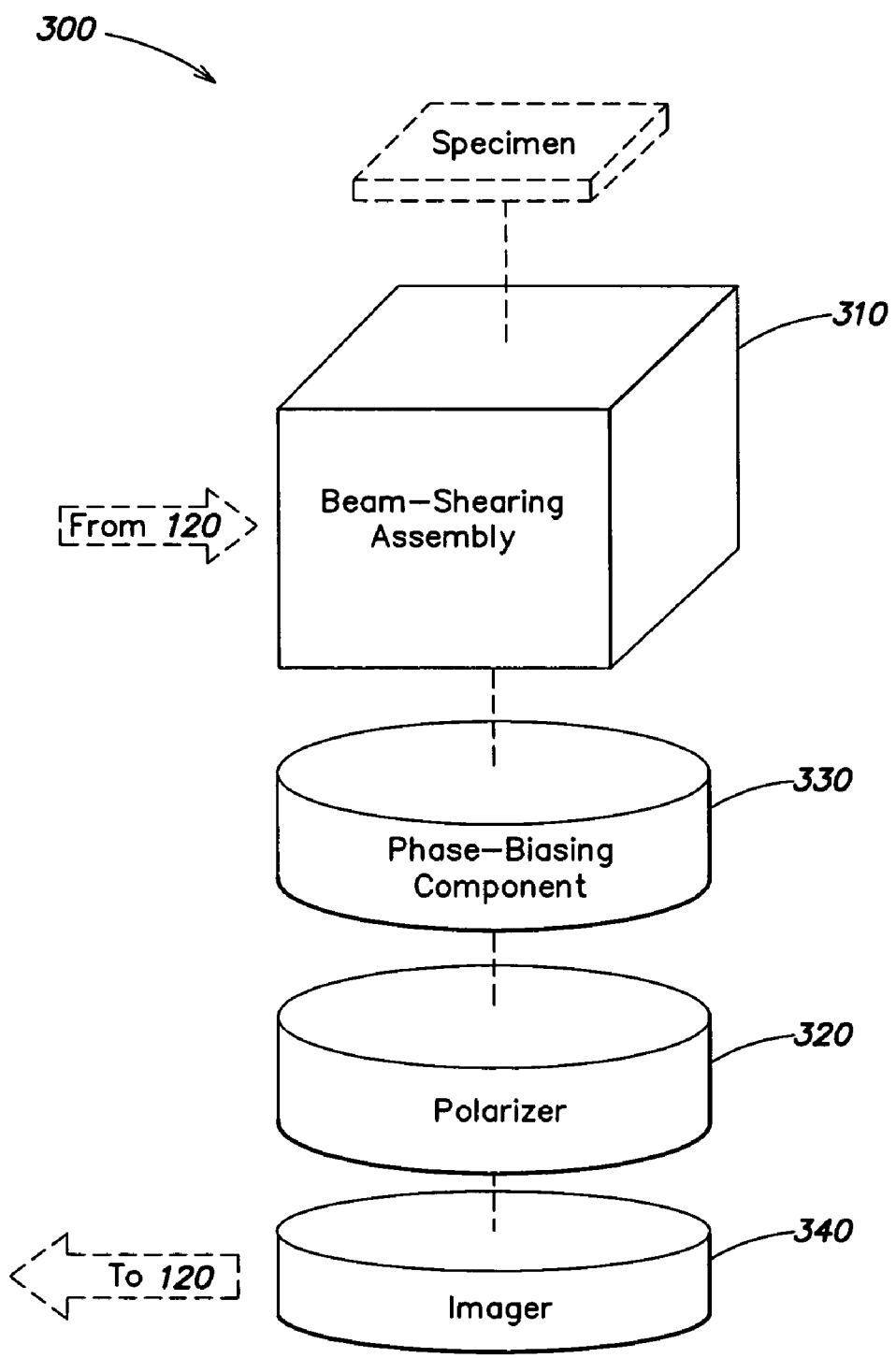
FIG. 3 is a block diagram of one embodiment of a DIC microscope, according to principles of the invention.

FIG. 3 illustrates a block diagram of a portion of a DIC microscope 300, according to one embodiment of the invention. The microscope 300 can be utilized, for example, as the microscope portion 310 of the microscopy system 100 described above. The microscope 300 can be used, for example, to automate implementation of the method 200; for example, the microscope, in one embodiment, receives control signals from the imaging-control unit 120 to cause a change in beam-shear direction.

The microscope includes a beam-shearing assembly 310 that includes a beam-shearing component, such as a Wollaston or Nomarski prism, or other suitable beam-shearing component. The assembly 310 is configured to provide a variable shear vector without movement, such as rotation, of the beam-shearing component, as described in more detail below with reference to FIG. 4. The microscope 300 can also include a polarizer 320, a phase-biasing component 330, an imaging array 340, and may include other components found in conventional DIC microscopes. The imaging array 340 may be any suitable image collection device, for example, a conventional digital image collection device.

The polarizer 320 can include, for example, a linear, circular, or elliptical polarizer. The polarizer 320 can be used to convert non-polarized to polarized light for use by the microscope 300. The phase-biasing component can include, for example, a wave plate providing a bias in a range of about 10° to about 40°, i.e., the phase retardation can be selected to retard one polarization direction by a value selected from a range of about 10° to about 40°. The bias of the phase-biasing component 330 can be selected, for example, to provide a desired level of contrast in an image produced by the microscope.

The microscope 300 can be implemented as a reflection microscope by utilizing the beam-shearing assembly 310 in both the illumination path and the imaging path of the microscope 300. Alternatively, the microscope can be implemented as a transmission microscope with the a beam-shearing assembly 310 used for the illumination path, and a second beam-shearing assembly included in an imaging path of the microscope (positioned, for example, above the specimen illustrated in FIG. 3.)

It will be understood by one having ordinary skill in the light microscopy arts that the microscope 300 includes one or more lenses, and can include other light altering components.

Figure 4:
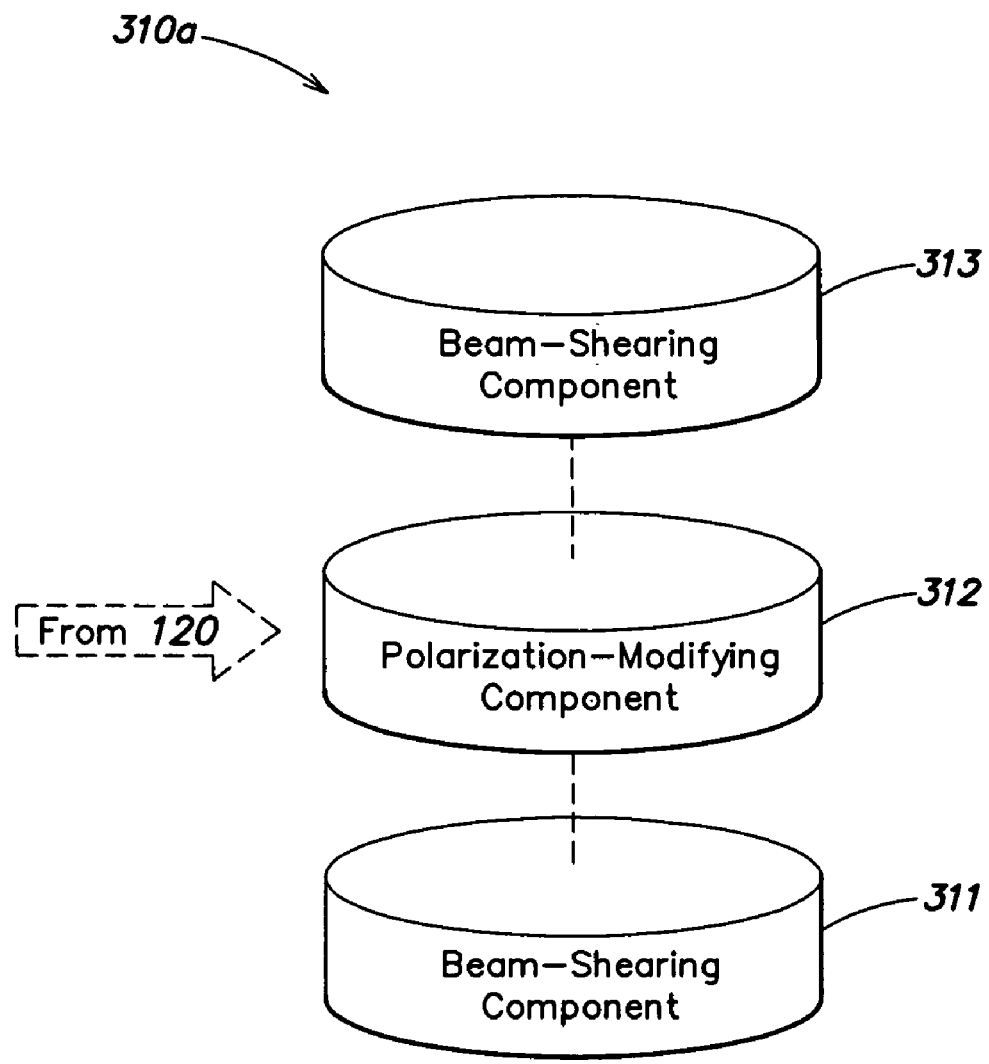
FIG. 4 is a block diagram of one embodiment of a beam-shearing assembly, according to principles of the invention.

FIG. 4 illustrates a block diagram of a beam-shearing assembly 310a, which may be used as the beam-shearing assembly 310 of the microscope 300 (see FIG. 3.) The beam-shearing assembly 310a includes a beam-shearing component 311, such as a Wollaston or Nomarski prism, a phase-modifying component 312, and a second beam-shearing component 313, such as a Wollaston or Nomarski prism. In the following description, the beam-shear components 311, 313, for simplicity, will be referred to as prisms. It will be understood, however, that this description is merely intended to be descriptive of some embodiments of the invention without limiting the invention to only those embodiments that include Wollaston, Nomarski, and/or other prisms as the beam-shearing components 311, 313.

The beam-shear direction of each of the prisms 311, 313 is different. For example, the prisms 311, 313 can have orthogonal beam-shear directions. The cooperative action of the prisms 311, 313 and the polarization-modifying component 312 provide a beam-shear direction that can be varied without movement of either prism 311, 313, for example, without rotation of either prism 311, 313.

The polarization-modifying component 312 can include, for example a wave plate. The wave plate can be rotatable to select the shear direction of the beam-shearing assembly 310a.

The wave plate can be, for example, a half-wavelength wave plate. The wave plate can be rotatable from at least a first orientation, which substantially aligns a fast axis of the wave plate with the shear direction of the first prism 311, to a second orientation, which misaligns the fast axis of the wave plate by about 45° from the shear direction of the first prism 311.

A wave plate can be rotated via an electromagnetic driver, for example. A wave plate can have dimensions of, for example, about 15 mm in diameter, and thickness of about 1 mm. The wave plate can be formed of, for example, quartz and/or a plastic film on a glass substrate. A wave plate/driver combination can support automated collection of, for example, about 2 images per second.

Alternatively, for example, the polarization-modifying component 312 can include a liquid-crystal cell. A liquid-crystal cell can be any suitable cell, such as a ferro-electric liquid-crystal polarization rotator available from Displaytech, Inc. (Longmont, Colo.). Alternatively, the polarization-modifying component 312 can include other electro-optical, a magneto-optical, acousto-optical, and/or other suitable components.

The polarization-modifying component 312 is configured, in some embodiments, to permit change of shear direction more rapidly than possible via rotation of prisms in conventional DIC microscopes. For example, some liquid-crystal cells can provide a change of shear direction at a rate of about 60 changes per second. Thus, in some embodiments of the, two or more images may be collected, and calculations performed to display a calculated image, in less than one second.

In one embodiment of the invention, the microscope 300, including the beam-shearing assembly 310a, is included in the microscope portion 110 of the microscopy system 100. The imaging-control unit 120 can be used to automate control of the beam-shearing assembly 310a to provide relative rapid collection of images, as well as calculation of orientation independent images, as described above.

Figure 5A:
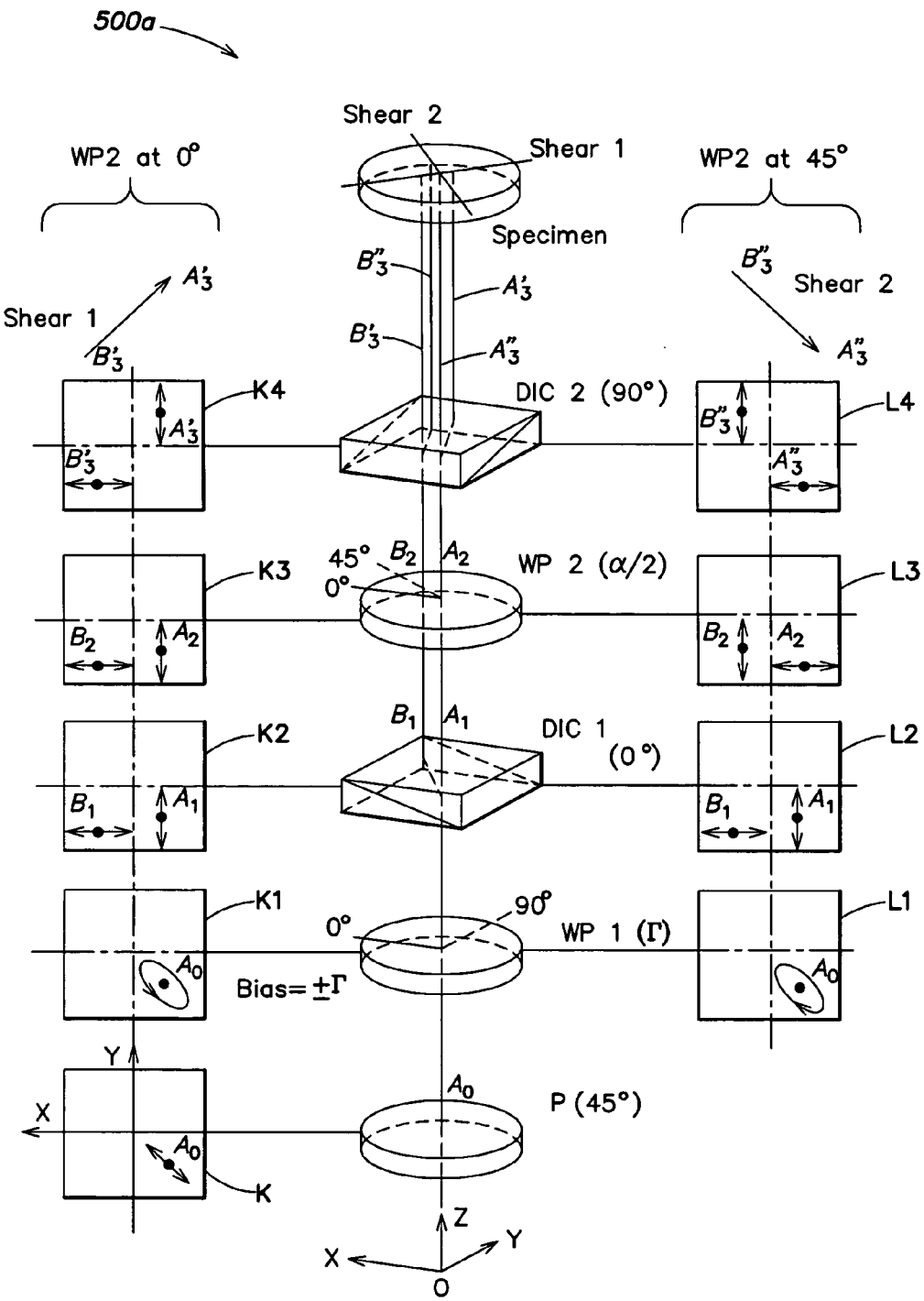
FIG. 5a is a block diagram an embodiment of a reflection microscope, according to principles of the invention.

FIG. 5a illustrates a block diagram of a reflection DIC microscope 500a, according to one embodiment of the invention. The microscope 500 includes a linear polarizer P, a first wave plate WP1, the first prism DIC1, a second wave plate WP2, and a second prism DIC2. For each component P, WP1, DIC1, WP2, DIC2, two spatial plots illustrating light-beam behavior are shown. The two sets of plots illustrate the light-beam behavior for two settings of the second wave plate WP2 (plot KL for an initial polarized beam, plots K1, K2, K3, K4 for the second wave plate WP2 oriented at 0°, and plots L1, L2, L3, L4 for the second wave plate WP2 oriented at 45°.)

The polarizer P converts unpolarized source light into an initial polarized beam $A_0$, which falls on the first prism DIC1. The azimuth of the polarizer P is set to 45° relative to the beam-shearing direction of the first prism DIC1 (the x-direction.) The first prism DIC1 can then split the initial beam $A_0$ into two polarized orthogonal components having equal intensities. In place of the linear polarizer P, for example, a circular polarizer or an elliptical polarizer could be utilized, with principal axis at 45° to the x-direction.

The first wave plate WP1 provides a phase retardation $\Gamma$. The azimuth of the fast axis of the first wave plate WP1 is oriented at 0° or at 90° to introduce a phase shift $\Gamma$ or $-\Gamma$ between the X- and Y-polarization components of the initial beam $A_0$.

As illustrated in the plots, an initial ray $A_0$ falling on the first prism DIC1 has lateral spatial coordinates (−1, −1), in arbitrary units, where the first number is associated with a direction along the X-axis, and the second number is associated with a direction along the Y-axis. The first prism DIC1 does not deflect a Y-polarization component, while it does deflect an X-polarization component. Thus, the initial ray $A_0$ is sheared into two components $A_1$, $B_1$. The first output ray $A_1$ is polarized along the Y-direction, and has coordinates (−1, −1). The second output ray $B_1$ is polarized along the X-direction. If, for example, the shear caused by the first prism DIC1 has a distance of 2 units, then the X-polarized second ray $B_1$ has coordinates (1, −1).

The second wave plate WP2 has half-wave retardance, and, as shown in the illustrated example of FIG. 5a, can be rotated between orientations of 0° and 45° relative to the x-direction. The second wave plate WP2 produces beams $A_2$, $B_2$ from incoming beams $A_1$, $B_1$.

The 0° orientation of the second wave plate WP2 preserves the linearly polarized states of the split beams so that incoming beams $A_1$, $B_1$ are identical to outgoing beams $A_2$, $B_2$. The 45° orientation rotates the polarization state of each incoming beam $A_1$, $B_1$ by 90° without altering the split beams' $A_1$, $B_1$ spatial coordinates.

The halfwave plate can be replaced by, for example, two quarterwave plates, one having an azimuth of 45° and the other having an azimuth of 45° or −45°. Other combinations of wave plates and polarization rotators can be utilized in place of a half-wave wave plate.

The second DIC2 prism is oriented orthogonal to (i.e., at 90° from) the direction of the first prism DIC1. Therefore, the shear direction of the second prism DIC2 lies along Y-axis. Therefore the prism DIC2 doesn't change a position of ray with X-polarization and deflects a ray with Y-polarization. The second prism shear is also 2 units, for instance.

As described above, the plots K1, K2, K3, K4 illustrate the behavior of the optical path of the microscope 500a when the second wave plate WP2 is set at 0°. The second prism DIC2 displaces only the beam having y-polarization, i.e., beam $A_2$, producing displaced beam $A_3'$. Thus, beam $A_2$ with y-polarization and coordinates (−1, −1) passes the second prism DIC2, and is displaced into output beam $A_3'$ with coordinates (−1, 1). The x-polarized beam $B_2$ remains unchanged by the second prism DIC2 as beam $B_3'$, and has unchanged coordinates of (1, −1).

Thus, for the second wave plate WP2 set at 0°, a beam-shear direction of 45° is obtained. The right-hand plots illustrate the behavior of the optical path of the microscope 500a when the second wave plate WP2 is set at 45°. For this setting, a beam-shear direction of −45° is obtained. Thus, rotation of the second wave plate WP2 from the 0° orientation to the 45° orientation rotates the shear direction by 90°. In each case, the shear magnitude is the same.

In the microscope 500a, light reflected by the specimen passes back along the same path, and experiences similar changes of polarization state, in reverse order. For example, if the first plate WP1 is set at the 0° orientation, the recombined beams have a relative bias of 2Γ. For the 90° orientation of the first plate WP1, the bias is −2Γ.

Figure 5B:
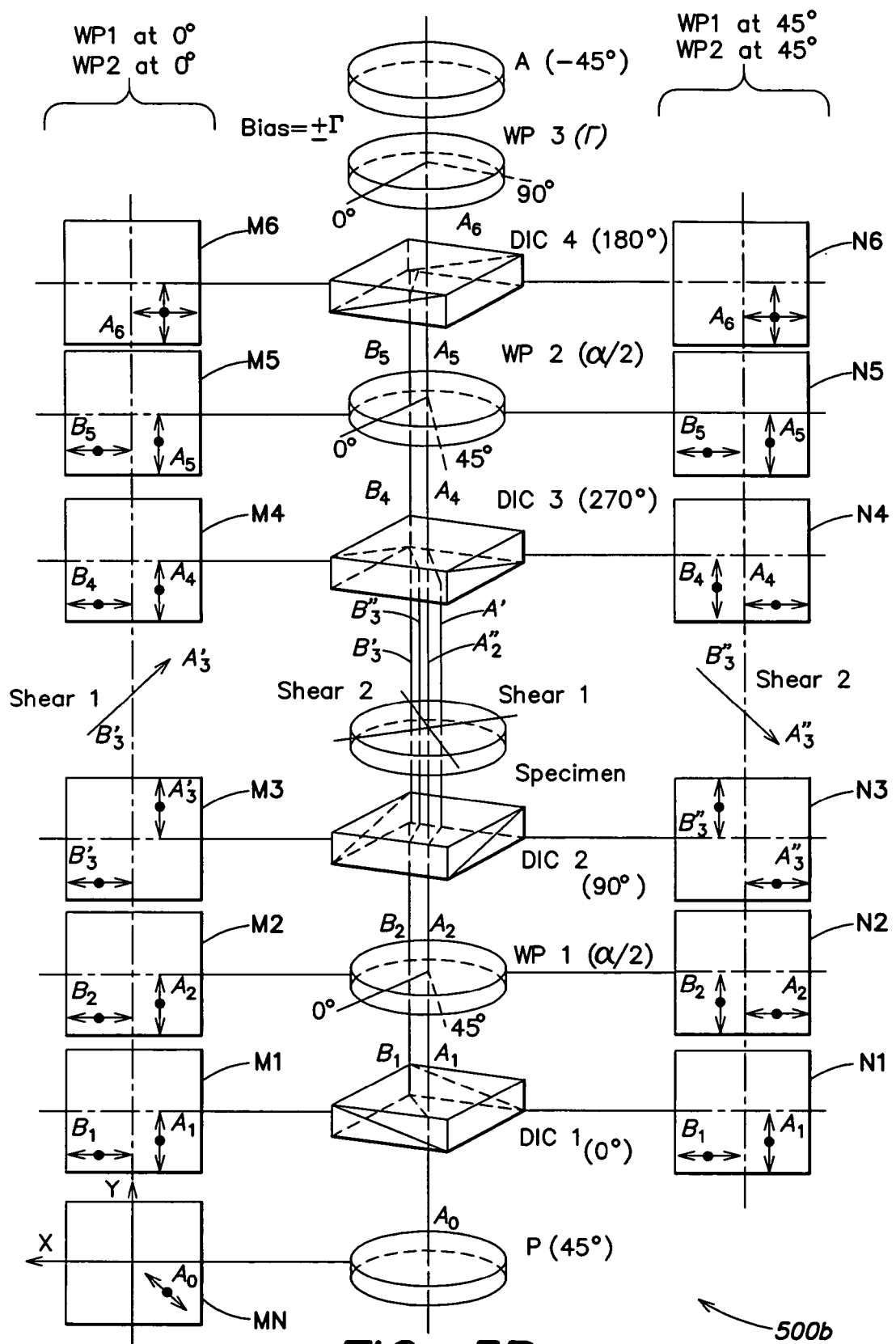
FIG. 5b is a block diagram of an embodiment of a transmission microscope, according to principles of the invention.

FIG. 5b illustrates a block diagram of a transmission DIC microscope 500b, according to one embodiment of the invention. The transmission DIC microscope 500b has similar construction and behavior to that of the reflection microscope 500a. The transmission DIC microscope 500b, however, has separate components for the illumination path and the imaging path, while the reflection DIC microscope 500a shares components for the two paths.

The transmission microscope 500b includes a linear polarizer P, a first prism DIC1, a first wave plate WP1, and a second prism DIC2, together providing a beam-shearing assembly for the illumination path of the transmission microscope 500b. The transmission microscope 500b also includes a third prism DIC3, a second wave plate WP2, and a fourth prism DIC4, together providing a second beam-shearing assembly for the imaging path of the transmission microscope 500b. The transmission microscope 500b also includes a first wave plate WP3 to provide a bias, and an analyzer A. For each component DIC1, WP1, DIC2, DIC3, WP2, DIC4, WP3, two columns of spatial plots illustrate the behavior of light-beams along the optical path. The two sets of plots illustrate the light-beam behavior for two paired settings of the first and second wave plates WP1, WP2 (plot MN for an initial polarized beam, plots M1, M2, M3, M4, M5, M6 for the first and second wave plates WP1, WP2 oriented at 0°, and plots N1, N2, N3, N4, N5, N6 for the first and second wave plates WP1, WP2 oriented at 45°.)

The third wave plate WP3 provides a phase retardation Γ. In this example of a transmission microscope 500b, the bias is introduced solely in the imaging path, rather than both the imaging and illumination paths as in the example of the reflection microscope 500a.

The first beam-shearing assembly splits the illumination beam $A_0$ into two orthogonally polarized beams $A_1$, $B_1$ in the same way as described above with respect to FIG. 5a. The a second beam-shearing assembly combines the two beams that have interacted with the specimen. Change of shear direction in the both beam-shearing assemblies is similar to that described above for the reflection microscope 500a. For example, as illustrated in the plots associated with each component DIC1, WP1, DIC2, DIC3, WP2, DIC4, WP3, the split beams ($A_1$, $B_1$, $A_2$, $B_2$, $A_3$, $B_3$, $A_3'$, $B_3'$, $A_3''$, $B_3''$, $A_4$, $B_4$, $A_5$, $B_5$) passing through each component, and recombined beam $A_6$, have a behavior analogous to the split beams ($A_1$, $B_1$, $A_2$, $B_2$, $A_3$, $B_3$, $A_3'$, $B_3'$, $A_3''$, $B_3''$), and recombined beam, of the reflection microscope 500a. Moreover, if the plate WP3 is at 0° position, a bias of Γ is introduced. For the 90°-position, the bias equals −Γ. The plate WP3 can be located, for example, on either side of the first prism DIC1 or the last prism DIC4.

Now referring to FIGS. 6a through 6f, to illustrate the appearance of calculated images that can be obtained, for example, via application of the method 200, some sample images were collected with a conventional DIC microscope. The sample images were processed according to the method 100 to obtain calculated orientation-independent images.

Figure 6D:
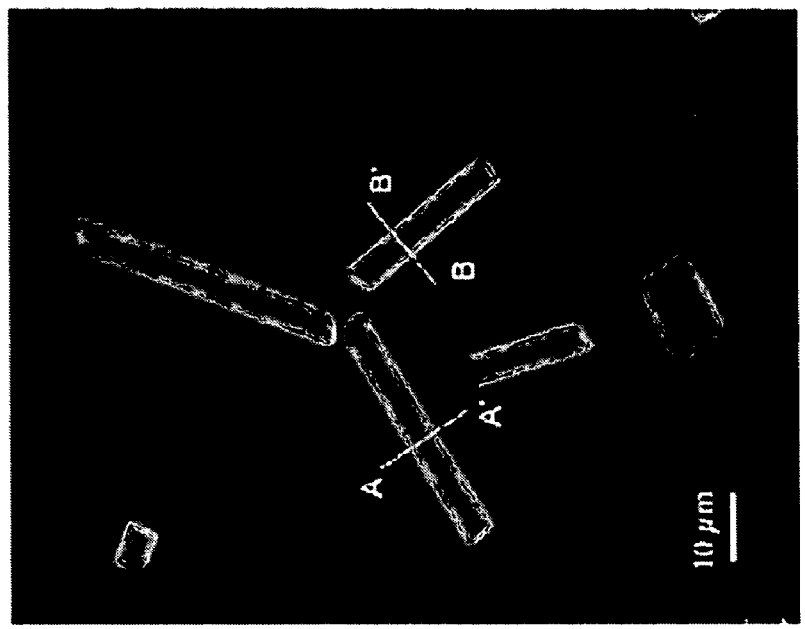
Figure 6A:
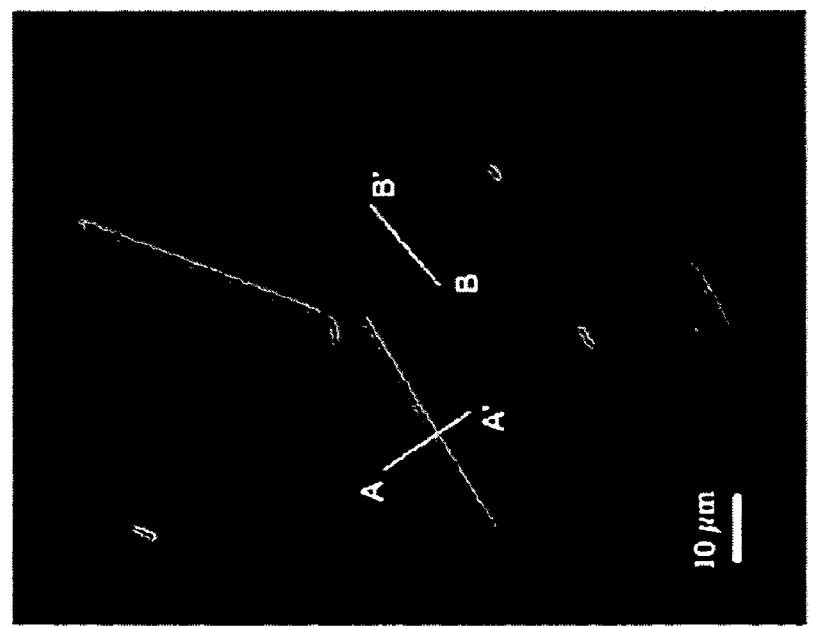
FIG. 6a is a collected image of a sample of a glass-rod sample specimen.
Figure 6B:
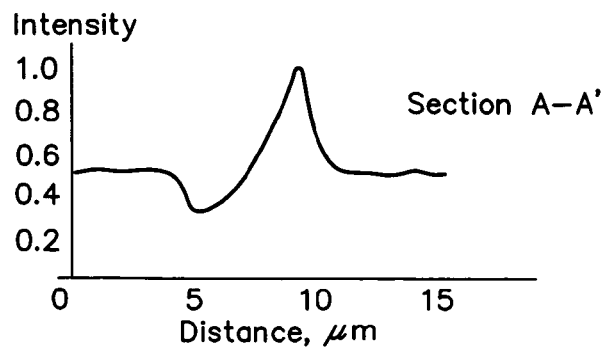
Figure 6C:
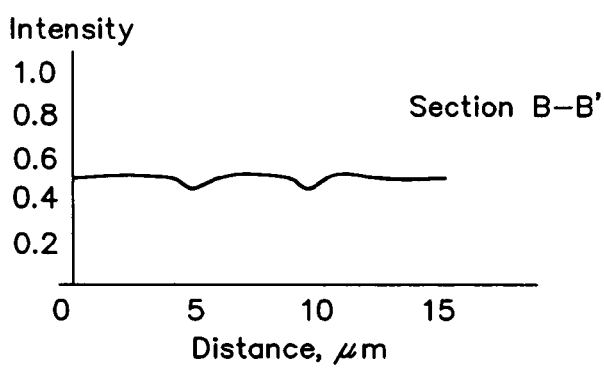

FIG. 6a is a sample collected image of a sample of glass rods mounted in PERMOUNT. FIG. 6b and FIG. 6c are graphs of image intensity profiles respectively for sections A–A' and B–B'. Four images were collected with four different shear directions, all at the same bias.

Figure 6E:
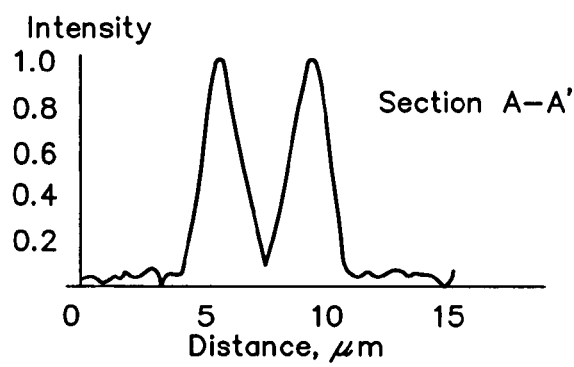
FIG. 6e is a graph of the image intensity profile for section A–A' of FIG. 6d.
Figure 6F:
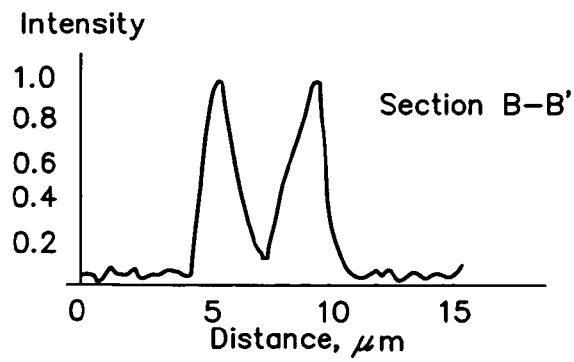
FIG. 6f is a graph of the image intensity profile for section B–B' for FIG. 6d.

FIG. 6d is a calculated orientation-independent gradient magnitude image. Black in the image corresponds to zero gradient magnitude, and white corresponds to a maximum calculate gradient magnitude. FIG. 6e and FIG. 6f are graphs, again, of image intensity profiles respectively for sections A–A' and B–B'. The graphs confirm that the rods have an orientation-independent appearance in the calculated image of FIG. 6d, in contrast to the orientation-dependent collected image of FIG. 6a.

FIGS. 7a through 7c show calculated images of the glass-rod sample. FIG. 7a is, again, a calculated orientation-independent gradient magnitude image. FIG. 7b is a calculated orientation-independent gradient direction image. The gradient direction image, in this example, uses a linear gray scale where black corresponds to 0° azimuth, and white corresponds to an azimuth approaching 360°. There is white noise in the background surrounding the glass rods because the direction of the gradient cannot be determined where the gradient vector has zero magnitude. FIG. 7c is a calculated orientation-independent specimen phase image.

Having thus described several aspects of at least one embodiment of this invention, it is to be appreciated various alterations, modifications, and improvements will readily occur to those skilled in the art. For example, beam-shearing assemblies, according to the invention, can be included in a DIC microscope that illuminates a specimen with unpolarized light, and includes a slit condenser diaphragm. The slit could be oriented, for example, at 45° and −45° to the shear direction of a first prism in a shear assembly. The slit orientation could be switched between these position, so that the shear direction of the slit in the illumination path is parallel to the shear direction of the assembly, which is in the imaging path.

Such, and other, alterations, modifications, and improvements are intended to be part of this disclosure, and are intended to be within the spirit and scope of the invention. Accordingly, the foregoing description and drawings are by way of example only.

What is claimed is:

1. A method for performing differential interference contrast microscopy on a specimen, comprising:
    collecting at least one image with illumination having a first beam-shear direction relative to a rotational orientation of the specimen;
    collecting at least one image with illumination having a second beam-shear direction relative to the rotational orientation of the specimen;
    determining data associated with an intensity distribution of each of the collected images; and
    calculating, from the determined data, values having a spatial distribution that is substantially independent of the rotational orientation of the specimen relative to the first beam-shear direction, wherein the values represent at least a spatial distribution of an optical phase characteristic of the specimen associated with a phase gradient magnitude or a phase gradient direction.

2. The method of claim 1, further comprising displaying information associated with the calculated values.

3. The method of claim 2, wherein the displayed information comprises at least one calculated image that is independent of the rotational orientation of the specimen relative to the first beam-shear direction.

4. The method of claim 3, wherein one of the at least one calculated image is calculated using a spatial distribution of the phase gradient magnitude or a spatial distribution of the phase gradient direction.

5. The method of claim 3, wherein the at least one calculated image corresponds to the spatial distribution of the optical phase characteristic of the specimen.

6. The method of claim 3, wherein one of the at least one calculated image is calculated using a combination of a first image portion associated with a spatial distribution of the phase gradient magnitude, and a second image portion associated with a spatial distribution of the phase gradient direction.

7. The method of claim 1, further comprising changing a beam-shear direction from the first beam-shear direction to the second beam-shear direction without rotating the specimen.

8. The method of claim 7, wherein changing comprises changing the beam-shear direction in less than 1.0 second.

9. The method of claim 1, further comprising collecting at least one image for a third beam-shear direction, and collecting at least one image for a fourth beam-shear direction.

10. The method of claim 1, further comprising collecting at least one background image.

11. The method of claim 1, wherein collecting the at least one image for the first beam-shear direction comprises collecting at least two raw images for a same phase bias condition.

* * * * *